3,361,693
WATER CONTAINING ORGANIC SOLVENT SOLUTIONS OF CHLOROPRENE-METHACRYLIC ACID COPOLYMERS
David Hartman Geschwind, Wilmington, Del., assignor to E. I. du Pont de Nemours and Company, Wilmington, Del., a corporation of Delaware
No Drawing. Filed Aug. 3, 1965, Ser. No. 477,037
4 Claims. (Cl. 260—29.3)

ABSTRACT OF THE DISCLOSURE

The improvement in the storage stability of solvent solutions containing chloroprene/methacrylic copolymers and an alkaline stabilizing ingredient such as magnesium oxide, either in the presence or absence of oil-soluble phenolic resins, by the addition of more than 2 parts of water per 100 parts of copolymer.

---

This application is a continuation-in-part of my copending application Ser. No. 401,231, filed Oct. 2, 1964, now abandoned.

This invention relates to improved cement compositions and, more particularly, to such compositions containing chloroprene/methacrylic acid copolymers which are stabilized against gelation.

Solvent solutions, i.e., cements, containing chloroprene/methacrylic acid copolymers are becoming increasingly useful for preparing adhesives and other fluid products which have broad industrial application. While the solvent solutions are often sufficiently chemically stable to be used within a short time, e.g., hours to days, many of the formulations have the undesirable property of increasing in viscosity and finally of gelling during prolonged storage, e.g., 1 to 6 weeks. This is troublesome because the cements must be mixed and used up within a short time, which is not generally convenient. The tendency for gelation to occur depends on the solvent mixture used for dissolving the chloroprene copolymer, the concentration of active ingredient, the absence of ingredients such as oil-soluble phenolic resins, and the presence of cross-linking agents such as the basic metal oxides of magnesium and zinc. Chloroprene copolymer adhesive cements containing magnesium oxide and heat reactive phenolic resins are popular because of the relatively high adhesive strengths of their bonds at elevated temperatures, but their viscosities also increase after formulation and they are susceptible to gelation. The selection of the solvent mixture, the concentration of active ingredient, the types and amounts of modifying resins, and the types and amounts of cross-linking agents cannot always be held at an optimum for maximum viscosity stability of the cements, because adhesive performance, production rates, and economics must also be considered. Thus, improved technology is needed to provide greater viscosity stability during storage of the chloroprene copolymer cements, without unreasonable sacrifice in cost, production rates and adhesive performance.

It has unexpectedly been found that the stability during storage of solvent solutions containing a chloroprene/methacrylic acid copolymer and an alkaline stabilizing ingredient such as magnesium oxide, either in the presence or absence of oil-soluble phenolic resins, is unexpectedly and dramatically improved by adding more than 2 parts of water per 100 parts of copolymer.

The following specific procedure may be used to prepare the chloroprene/methacrylic acid copolymers which are preferred for preparing the viscosity-stable solvent compositions of this invention.

Chloroprene containing from about 0.1% to 5% by weight of dissolved methacrylic acid is emulsified in water through the use of surfactants such as organic sulfonates or organic sulfates. The quantity of methacrylic acid determines the approximate concentration of acid units in the final copolymer. A modifying agent or chain transfer agent should be included in the emulsion to control the molecular weight and viscosity of the finished polymer. As known by those skilled in the art, increasing amounts of a given modifier lower molecular weight and viscosity. Examples of suitable modifying agents are aliphatic mercaptans having 4 to 18 carbon atoms and dialkyl xanthogen disulfides in which the alkyl groups have 1 to 8 carbon atoms. Polymerization is actually accomplished by means of a redox catalyst, examples of which are potassium persulfate in combination with sodium sulfite, hydrogen peroxide in combination with potassium hydrosulfite, cumene hydroperoxide with sodium formaldehyde sulfoxylate and potassium ferricyanide with sodium sulfite. The catalyst components are added to the system in such a way as to give a controllable polymerization. The polymerization can be conducted at temperatures ranging from about 0° C. to 60° C., but temperatures around 40° C. are preferred. It is preferred that the reaction be allowed to reach a high conversion in order to insure adequate copolymerization of the less reactive acid comonomer. Thus, the conversion should be above about 70% and preferably around 90%. The progress of the polymerization may be followed by the change in specific gravity. When the desired conversion has been reached the polymerization may be stopped by the addition of substances such as phenothiazine, p-tertiary-butylpyrocatechol and ditertiarybutyl hydroquinone.

An alternative method is to form an emulsion containing all of the methacrylic acid and only part of the chloroprene and gradually to add an emulsion containing the remainder of the chloroprene to the system during the course of the polymerization. Optionally, sulfur or sulfur dioxide may be present during the polymerization to incorporate polysulfide or sulfonyl linkages into the copolymer.

Polymer may be isolated directly from the polymerization mass by removing unreacted chloroprene by steam-stripping as disclosed in U.S. Patent 2,467,769, for example, followed by freeze coagulation as disclosed in U.S. Patent 2,187,146. It is preferable, however, to adjust the hydrogen ion concentration in the latex to a pH of 8 or above with a base, such as dilute sodium hydroxide or ammonium hydroxide before steam-stripping and freeze coagulation. This adjustment of pH prior to these operations minimizes the amount of coagulum formed during the isolation. For this adjustment a 2% solution of sodium hydroxide is especially preferred. Copolymers isolated without pH adjustment are believed to contain free carboxyl groups introduced by the methacrylic acid. The carboxyl groups of copolymers isolated following pH adjustment with a base are believed to exist partially in the form of their salts. While sodium salts are preferred, the carboxyl groups in the copolymer may be in the form of a salt formed with any monovalent cation.

Copolymers produced by this procedure or related procedures which contain about 0.02 to 0.7 weight percent carboxyl groups, may be used directly in preparing the solvent cements of this invention. The preferred concentration of carboxyl groups is from 0.1 to 0.4.

Conventional chloroprene polymer cements normally contain one or more alkaline stabilizing ingredients such as the divalent metal oxides, e.g., zinc oxide and magnesium oxide. Such ingredients are required to insure good aging of the chloroprene polymers. In addition they slowly vulcanize deposited films at ambient temperatures. The cement compositions of the present invention also require the inclusion of alkaline stabilizing ingredients for the same reasons. These alkaline ingredients appear to play an even more important role as curing or cross-linking agents for the chloroprene/methacrylic acid copolymers. In these carboxyl containing copolymers, the alkaline stabilizing ingredients are believed to form ionic cross-links through salt formation. In conventional curing of chloroprene polymers curing presumably involves reaction with allylic chlorine atoms.

The alkaline stabilizing ingredients which have been found to be useful in preparing the compositions of the present invention may be selected from the group consisting of magnesium oxide, zinc oxide, alkaline magnesium salts, alkaline zinc salts and mixtures thereof. In many compositions, good results are obtained if magnesium oxide and zinc oxide are both employed, but either of these oxides may be used separately to prepare the solvent adhesive of this invention. Other alkaline zinc or magnesium compounds which may be used include the carbonates and the salts of organic carboxylic acids, such as acetic, octanoic, and benzoic acids. In cements containing magnesium oxide-modified phenolic resins, the magnesium content of the resin itself is adequate to serve as an acid acceptor and curing agent. Any magnesium or zinc compound which is sufficiently alkaline to serve as acid acceptor and curing agent may be used as the alkaline ingredient.

The quantity of alkaline ingredients which should be employed in the compositions of the present invention should be chemically equivalent to at least 2 parts of magnesium oxide per 100 parts of chloroprene/methacrylic acid copolymer. While such small amounts of alkaline materials are adequate for many applications, it is usually desirable to use amounts of alkaline ingredients more or less equivalent to the quantities of magnesium oxide and zinc oxide employed with conventional chloroprene polymers; namely, 4 parts of magnesium oxide plus 5 parts of zinc oxide per 100 parts of polymer. It should be noted that when mixtures of alkaline materials are used, it is only necessary that the total equivalents of alkaline materials be chemically equivalent to at least 2 parts of magnesium oxide per 100 parts of chloroprene polymer; while the upper limit is not particularly critical, usually less than about 30 parts per 100 parts are employed. Preferred amounts range from the equivalent of about 4 parts to about 10 parts of magnesium oxide per 100 parts of polymer. This amount of alkaline agent present includes the amount which has reacted with the resin.

The use of 1 part of water in solvent solutions of chloroprene polymers in combination with alkaline stabilizing ingredients, e.g., magnesium oxide, and with various modified phenolic resins, is disclosed in the prior art. Used in this way, the water promotes reactivity between the resin and the alkaline stabilizing ingredients to provide improvements in adhesive properties of the cements. The prior art discloses that about 1% of water by weight is adequate for this reaction.

In the present invention, water improves the viscosity stability of the chloroprene/methacrylic acid copolymer solutions when only the polymer and an alkaline stabilizing ingredient is present. Furthermore, it has been found that more than about 2 parts of water produces suitable viscosity stability, and the preferred range is 5 to 15 parts of water per 100 parts by weight of copolymer. While the upper limit is not particularly critical, usually less than about 25 parts per 100 are employed.

Resins are often included in conventional chloroprene polymer solvent adhesives to improve tack retention, to reduce apparent viscosity or to increase adhesion and cohesion. These resins may be used for similar purposes in the compositions of the present invention in amounts of about 10–100 parts by weight per 100 parts by weight of the chloroprene copolymer.

It is a noteworthy feature of this invention that the use of resins is optional, because viscosity stability during storage can be achieved by the addition of water even in the absence of resins. While the use of various resins to be described does help to improve the properties of the cements for use in adhesive applications, and the use of certain resins does tend to improve the viscosity-stability of the copolymer based cements, their use in the present invention is not mandatory, although it is preferable to include them in most formulations.

Two general classes of oil-soluble phenolic resins are useful in the cements of this invention: thermoplastic resins and heat-reactive resins.

The thermoplastic, oil-soluble phenol-aldehyde resins generally have moderately low molecular weights, are relatively free of cross-linking and usually contain hydrocarbon substituents which confer oil-solubility. Representative resins include terpene-modified phenolic resins, furfuralphenolic resins and phenolic-modified coumarone-indene resins. Of these resins, the terpene-modified phenolics are preferred. These materials can be made by acid condensation of terpene hydrocarbons or alcohols with phenol, followed by catalytic resinification of the substituted phenol with formaldehyde. Preferred amounts of these resins range from 20–70 parts per 100 parts of chloroprene copolymer. Although the thermoplastic resins do not yield cements which remain free of gel for extended periods of time, except when water is present, they improve the stability of the chloroprene/methacrylic acid copolymer solutions which in the absence of the resins and water often show gelation in a matter of hours. The compositions containing the thermoplastic resins have good tack retention.

The heat-reactive phenolic resins are also useful for preparing the novel viscosity-stable solutions of this invention. This class of oil-soluble phenolics may be prepared by reacting 1 mole of a para-substituted phenol with about 1–2 moles of formaldehyde in the presence of an alkaline condensation catalyst. Phenols substituted in the paraposition with alkyl groups having 3 to 8 carbon atoms are useful for preparing these resins. Examples of such phenols include p-isopropyl phenol, p-tertiary-butyl phenol, p-cyclohexyl phenol, p-tertiary-amyl phenol and p-octyl phenol. Resins derived from p-tertiary-butyl phenol are especially preferred and are readily available. Aryl-substituted phenols, such as p-phenyl and tolyl-phenols, may also be used.

The resins formed from these phenols are thermoplastic in their original state but on reacting with the alkaline material, they form a modified resin which no longer melts on heating, but instead decomposes only at very high temperatures on the order of 250° C. These resins still retain their oil-solubility after being modified by reaction with the alkaline material. These reacted resins will hereafter be referred to as modified resins.

Any of the solvents or solvent mixtures commonly used in preparing conventional chloroprene solvent cements may be used in preparing the compositions of the present invention. The preferred solvents are usually blends of two or more organic materials. Aromatic hydrocarbons such as toluene and xylene, chlorinated hydrocarbons such as trichloroethylene, certain ketones such as methyl ethyl ketone, and esters such as ethyl acetate are good solvents used either alone or in combination with other solvents. Blends of solvents containing aliphatic hydrocarbons such as hexane and heptane, in which the chloroprene copolymers are not soluble alone, are widely used. Three-component solvent mixtures also find use in preparing the compositions of the present invention. A preferred mixture is made up from equal weights of toluene, hexane and ethyl acetate.

The solvent cement compositions of this invention may be prepared by the procedures employed for the manufacture of conventional chloroprene polymer cements. The most common procedure is to mill-mix the chloroprene copolymer with compounding ingredients, except resin, and to dissolve the resulting compound and resin (if used), in solvent along with the water in a cement churn or other suitable mixer. This technique is satisfactory with the chloroprene copolymers used in this invention, but milling should be kept to a minium for the compounded copolymers tend to scorch more readliy than do solution grades of conventional chloroprene polymers. While mill-mixing often results in better dispersion of dry ingredients, it is not required in this invention and a slurry method may be used. This latter procedure involves adding all the dry ingredients to a churn containing copolymer, solvent and water and agitating until the copolymer dissolves. If difficulty is experienced in getting a proper dispersion of solids with the slurry method, the dry ingredients except resin can be dispersed in a portion of solvent in a ball mill before addition to the churn containing copolymer, resin (if used) and remaining solvent and water. Regardless of the method of preparation of the solvent solutions containing the chloroprene/methacrylic acid copolymers, whenever excessive reaction occurs with the metal salt curing agent, the composition will not uniformly dissolve in the solvent, but will only swell and produce a "gelled" material. As used to describe the solvent compositions either as prepared, or after storage, the term "gelled" refers to a non-homogeneous, jellylike, solvent suspension of the copolymer composition, having a viscosity greater than about 40,000 centipoises as measured by the method used in the examples. A surprising feature of the present invention may be observed when a chloroprene copolymer solvent cement which has gelled is intimately mixed with water. In this case, the viscosity of the gelled cement is reduced to a level approaching that obtained from a cement which is stabilized with water when originally prepared. Thus, cements which are substantially gelled may be reclaimed in accordance with the invention.

Although the solvent compositions of the present invention require only four components for their preparation, i.e., chloroprene copolymer, an alkaline compound of zinc or magnesium, water, and a suitable solvent or solvent blend, other components which find use in conventional chloroprene polymer formulations often may be added to advantage.

In order to insure the excellent aging properties associated with chloroprene polymers, it is desirable to include an antioxidant in the present compositions. Any antioxidant employed in conventional chloroprene polymer formulations may be incorporated. About 2 parts of antioxidant per 100 parts of elastomer is usually adequate. If discoloration is no problem, N-phenyl-beta-naphthylamine is preferred. If a non-staining, non-discoloring antioxidant is required, a variety of alkylated phenol type antioxidants may be used.

Conventional fillers such as clay, whiting, and carbon black may be added to the cements of this invention. Pigments such as carbon black and titanium dioxide may also be added.

The viscosity-stable compositions of this invention are primarily intended to be used for applications involving solvent adhesives, to be used in the preferred viscosity range below 2000 centipoises, but they may also be useful for the preparation of coatings, or spreading cements for coated fabrics and of caulks, at other viscosity levels.

The less viscous compositions of the present invention (less than about 2000 centipoises viscosity) may be used directly as coatings which can be applied by brushing, dipping or spraying. The amounts and types of solvents employed in preparing compositions for coating purposes may be varied to control viscosity, solids and drying rate. Pigments, such as carbon black and titanium dioxide, may also be added to compositions to be used as coatings.

Viscous cements, of homogeneous plastic consistency, as distinguished from high viscosity, "gelled" cements, can be prepared from the compositions included in this invention. Means available for increasing viscosity in these cements include raising the concentration of copolymer, adding large amounts of inert filler and using high Mooney viscosity copolymers in addition to incorporating the essential components, including water. The choice of these means depends on the proposed use. These high viscosity compositions (about 20,000 centipoises) can be applied by spreading and troweling, or by means of a caulking gun. These compositions are useful as mastics, sealers and caulks.

Thus, the solvent solutions of the present invention are of maximum use when there is no gel present and the viscosity is below about 20,000 centipoises. For solvent solutions which are useful for adhesive applications, a viscosity below about 2000 centipoises is generally preferred.

The invention will now be described with reference to the following examples of specific embodiments thereof wherein parts and percentages are by weight unless otherwise specified.

*Example 1*

A preferred copolymer of methacrylic acid and chloroprene for use in the current compositions of the present invention is prepared by the following procedure. Methacrylic acid is employed in a ratio of 1.33 parts/100 parts of chloroprene.

An emulsion is prepared using the following recipe:

| | Parts |
|---|---|
| Chloroprene | 13,500 |
| Methacrylic acid | 180 |
| Diisopropyl xanthogen disulfide | 120 |
| Water | 18,067 |
| Amine salts of alkylated benzene-sulfonic acid | 176 |
| Sodium salt of formaldehyde-naphthalene-sulfonic acid condensate | 80 |

Polymerization is performed at 40° C. in a nitrogen atmosphere. The polymerization is catalyzed by adding 0.2 part of 30% hydrogen peroxide followed by the addition of 0.05 part portions of 1% potassium hydrosulfite solution. Addition of the potassium hydrosulfite solution is regulated to give the desired rate of polymerization. Polymerization is carried out to about 90% monomer conversion. At this conversion, the specific gravity of the latex is about 1.08 at 40° C. for this recipe.

Polymerization is then stopped by adding 70 parts of an emulsion having the following composition:

| | Parts |
|---|---|
| Water | 21.0 |
| Sodium lauryl sulfate, paste, 30% A.I. | 2.0 |
| Sodium salt of formaldehyde-naphthalene-sulfonic acid condensate | 0.7 |
| Benzene | 45.0 |
| Phenothiazine | 0.7 |
| p-Tertiary-butylpyrocatechol | 0.7 |

The hydrogen ion concentration of the latex is adjusted to a pH of 8 by the addition of 2% sodium hydroxide solution. Unreacted chloroprene is removed by steam-stripping as described in U.S. Patent 2,467,769, after which the copolymer is removed from the latex by freeze coagulation in the form of a thin film as described in U.S. Patent 2,187,146. The Mooney viscosity of this copolymer is about 46-48, ML-212° F. 2.5 minutes. Analysis shows that the methacrylic acid content of the copolymer is approximately 0.45% (0.24% carboxyl groups).

By following the polymerization procedure described above and employing greater or lesser amounts of methacrylic acid relative to chloroprene, or by varying conversion at a given chloroprene/methacrylic acid ratio, copolymers containing varying amounts of methacrylic acid can be prepared. By varying the amount of modifier, the viscosity of the polymer may be controlled. Isolation of the copolymers produced by this polymerization procedure may be accomplished by freeze coagulation without prior pH adjustment. Isolation of copolymer from latex by freeze coagulation may also be accomplished following adjustment of the pH to about 8 with 28% ammonium hydroxide.

One hundred grams of the chloroprene/methacrylic acid copolymer is milled for about 10 minutes on a conventional 2-roll rubber mixing mill, and then 8 grams of extra light calcined magnesium oxide is added, followed by mixing together for about 5 minutes at a mill-roll temperature about 50° C. This mixed stock is added to a cement churn together with 495 grams of a mixture of toluene, hexane and ethyl acetate in a weight ratio of 1:1:1, and with the concentrations of water as shown in Table I. The ingredients are rolled in the churn at room temperature for about 24 hours until a smooth solution is formed or until it is apparent that a smooth solution will not be made.

Samples of the compositions A, B, C, D and X are removed and observed visually, followed where possible by testing the viscosity at room temperature with a Brookfield viscosity instrument using a speed of 30 revolutions per minute. The samples are stored at room temperature in closed glass containers, and they are re-examined and retested at the various times shown in Table I.

TABLE I

|  | Sample | | | | |
| --- | --- | --- | --- | --- | --- |
|  | A | B | C | D | X |
| Water Content [1] | 2 | 5 | 10 | 25 | None. |
| Viscosity as prepared [2] | 1,180 | 340 | 350 | 450 | Gelled. |
| After 1 week storage | 2,460 | 340 | 340 | 430 |  |
| After 2 weeks storage | 3,040 | 340 | 320 | 380 |  |
| After 4 weeks storage | 8,720 | 340 | 320 | 370 |  |
| After 6 weeks storage | 22,300 | 380 | 350 | 420 |  |
| After 8 weeks storage | Gelled | 530 | 390 | 460 |  |

[1] Parts by weight of water per 100 parts by weight of chloroprene copolymer.
[2] Viscosity reported in centipoises.

*Example 2*

One hundred grams of the chloroprene/methacrylic acid copolymer is milled for 10 minutes on a conventional 2-roll rubber mixing mill, and then 2 grams of phenylbetanaphthylamine, 8 grams of extra light calcined magnesium oxide, and 5 grams of zinc oxide are added, followed by mixing together for about 5 minutes at a mill-roll temperature about 50° C. The mixed stock is added to a cement churn together with 450 grams of a mixture of toluene, hexane, and ethyl acetate in a weight ratio of 1:1:1, and with the concentrations of water as shown in Table II. The ingredients are rolled in the churn at room temperature for about 24 hours until a smooth solution is formed or until it is apparent that a smooth solution will not be made. The samples are tested according to the procedures used for Example 1.

TABLE II

|  | A | B | X |
| --- | --- | --- | --- |
| Water content | 3 | 5 | None. |
| Viscosity as prepared | 780 | 900 | Gelled. |
| After 1 week storage | 1,280 | 980 |  |
| After 2 weeks storage | 2,160 | 960 |  |
| After 1 month storage | 15,200 | 1,000 |  |

*Example 3*

The procedure of Example 1 is followed except the solvent is a mixture of methylethylketone and hexane in a weight ratio of 3:2.

TABLE III

|  | Sample | |
| --- | --- | --- |
|  | A | X |
| Water content | 10 | None. |
| Viscosity as prepared | 480 | Gelled. |
| After 1 week storage | 500 |  |
| After 6 weeks storage | 580 |  |
| After 12 weeks storage | 850 |  |

*Example 4*

The procedure of Example 1 is followed except 40 parts by weight of "Durez 12603" (an oil-soluble, thermoplastic, terpene-modified phenol/formaldehyde resin having an M.P. of 302° F. and being soluble in nonpolar solvents; manufactured by Durez Division of Hooker Electrochemical Company), per 100 parts by weight of copolymer is added with the solvent.

TABLE IV

|  | Sample | |
| --- | --- | --- |
|  | A | X |
| Water content | 10 | None. |
| Viscosity as prepared | 300 | 1,630 |
| After 1 week storage | 300 | 2,700 |
| After 2 weeks storage | 300 | 4,920 |
| After 4 weeks storage |  | Gelled. |
| After 8 weeks storage | 320 |  |

*Example 5*

One hundred grams of the copolymer of Example 1 is milled for about 10 minutes on a conventional 2-roll rubber mixing mill, and 2 grams of "Neozone A" antioxidant, 8 grams of extra light calcined magnesium oxide, and 5 grams of zinc oxide are added, followed by mixing together for about 5 min. at a mill-roll temperature about 50° C. The mixed stock is added to a churn together with 150 grams each of toluene, hexane, and ethyl acetate. The mixture is rolled in the churn at room temperature for about 24 hours. The Brookfield Instrument viscosity as prepared is 5200 centipoises using a No. 2 spindle at a speed of 12 revolutions per minute. After 1 day of storage at room temperature the cement has gelled.

The gelled cement is placed in a churn at room temperature, 10 grams of water is added and the mixture is rolled in the churn for about 16 hours. The viscosity according to the above method is 1200 centipoises. After 12 days' storage at room temperature the viscosity is 1580 centipoises.

*Example 6*

A cement is prepared according to the procedure of Example 5 except 10 grams of water is added to the churn along with the solvents and then the mixure is rolled in the churn at room temperature for about 24 hours. As thus prepared, the viscosity according to the method of Example 5 is 670 centipoises. After 14 days' storage at room temperature, the viscosity is 610 centipoises.

Example 7

The procedure of Example 1 is followed except 5 parts of zinc oxide per 100 parts by weight of copolymer is incorporated at the same time as the magnesium oxide is added.

TABLE V

|  | Sample | |
|---|---|---|
|  | A | X |
| Water content | 10 | None. |
| Viscosity as prepared | 1,540 | Gelled. |
| After 1 week storage | 1,820 | |
| After 4 weeks storage | 3,780 | |

As used herein the term chloroprene/methacrylic acid copolymer includes those wherein part of the chloroprene, up to an equal amount by weight, may be replaced with another organic monomer which does not contain a carboxyl group but which is copolymerizable with chloroprene, e.g., 2,3-dichloro-1,3-butadiene, isoprene, 1,3-butadiene, acrylonitrile, methyl methacrylate, styrene and the like. Likewise, the copolymer may be prepared in the presence of sulfur or sulfur dioxide so that the final copolymer will contain, respectively, polysulfide or sulfonyl linkages.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:

1. A viscosity-stable composition comprising (1) an organic solvent solution of a chloroprene/methacrylic acid copolymer containing about 0.02 to 0.7 weight percent carboxyl groups, (2) an alkaline stabilizing ingredient selected from the group consisting of magnesium oxide, zinc oxide, alkaline magnesium salts and alkaline zinc salts, and their mixtures, in amounts equivalent to at least 2 parts of magnesium oxide per 100 parts of chloroprene copolymer, and (3) more than 2 but not more than about 25 parts of water per 100 parts of copolymer.

2. A composition as defined in claim 1 containing about 10 to 100 parts, per 100 parts of chloroprene polymer of an oil-soluble phenolic resin selected from the group consisting of thermoplastic, low-molecular weight phenol-aldehyde resins, and heat-reactive para-substituted phenol-aldehyde resins.

3. A viscosity-stable composition comprising (1) an organic solvent solution of a chloroprene/methacrylic acid copolymer containing about 0.1 to 0.4 weight percent carboxyl groups, (2) an alkaline stabilizing ingredient selected from the group consisting of magnesium oxide, zinc oxide, alkaline magnesium salts and alkaline zinc salts and their mixtures, in amounts equivalent to from 2 to 30 parts of magnesium oxide per 100 parts of chloroprene copolymer and (3) from about 5 to 15 parts of water per 100 parts of copolymer.

4. A composition as defined in claim 3 containing about 20 to 70 parts, per 100 parts of chloroprene polymer, of an oil-soluble phenolic resin selected from the group consisting of thermoplastic, low-molecular weight phenol-aldehyde resins, and heat-reactive para-substituted phenol-aldehyde resins.

References Cited
UNITED STATES PATENTS

| 2,194,350 | 3/1940 | Berg | 260—82.1 |
| 3,078,247 | 2/1963 | Sinn et al. | 260—29.7 |
| 3,298,989 | 1/1967 | Moore | 260—29.3 |

MURRAY TILLMAN, *Primary Examiner.*

J. C. BLEUTGE, *Assistant Examiner.*